United States Patent [19]

Van Saders et al.

[11] Patent Number: 4,836,681

[45] Date of Patent: Jun. 6, 1989

[54] FRINGE PATTERN PHASE DETECTION SYSTEM

[75] Inventors: John G. Van Saders, Asbury, N.J.; Andrew Tarasevich, Forrest Hills, N.Y.; Michael C. Reichenbach, Huntsville, Ala.

[73] Assignee: Lockheed Electronics Co., Inc., Plainfield, N.J.

[21] Appl. No.: 867,026

[22] Filed: May 27, 1986

[51] Int. Cl.$^4$ .................. H01J 3/14; H01J 40/14; G02B 27/44; G01B 11/14
[52] U.S. Cl. ................... 356/374; 250/550; 250/237 G
[58] Field of Search .............. 356/345, 374; 250/550, 250/237 G; 33/125 C

[56] References Cited

U.S. PATENT DOCUMENTS 4,231,662 11/1980 Feinland et al. ............ 250/237 G X
4,427,883 1/1984 Betensky et al. ............ 250/237 G

OTHER PUBLICATIONS

L. Mertz; "Real Time Fringe Pattern Analysis", *Applied Optics*, vol. 22, 1983.
G. L. Rogers; *Non-Coherent Optical Processing*, John Wiley & Sons, pp. 95-117, 1977.

*Primary Examiner*—David Mis
*Attorney, Agent, or Firm*—Hopgood, Calimafde, Kalil, Blaustein & Judlowe

[57] ABSTRACT

Electro-optical apparatus measures the average relative phase of an incident wave fringe pattern. The subject fringe, e.g., an interferometric pattern, passes through three sections of an optical mask, one characterized by fixed transmissivity and the other two by quadrature-displaced spatial fringe patterns. The light passing through each section is separately collected and detected to average the respective incident wave/mask section interactions. The phase of the incident fringe pattern relative to the mask is then determined by arithmetically processing the detected signals.

In accordance with one aspect of the present invention, the subject fringe pattern is time modulated and the quadrature-shifted mask signals A-C coupled to obviate the requirement for the third, fixed transmissivity mask section.

13 Claims, 3 Drawing Sheets

FRINGE PATTERN PHASE DETECTION SYSTEM

This invention relates generally to data processing systems and, more specifically, to a digital electro-optical system which detects the phase of incident fringe patterns.

BACKGROUND AND OBJECTS OF THE INVENTION

Important applications of current interest require that the relative phase of an incident fringe pattern vis-a-vis a fixed reference be determined. Such fringe patterns are developed, for example, by interference between split components of a coherent light beam and are used for purposes per se well known, e.g., to measure small distance displacements, surface contours or irregularities, object shapes and forms, and the like.

It is an object of the present invention to provide an improved electro-optical processing apparatus.

More specifically, it is an object of the present invention to provide an electro-optical system for measuring the phase or phase shift of a wave fringe pattern.

It is another object of the present invention to provide electro-optical fringe phase detection apparatus which averages a phase measurement over plural cycles (wavelengths).

Yet another object of the present invention is the provision of fringe pattern phase measurement structure operable on a time variable basis to obviate processing of bias or direct current signal constituents.

A still further object of the present invention is to provide electro-optical apparatus for effecting complex multiplication.

SUMMARY OF THE INVENTION

The above and other objects of the present invention are realized in specific, illustrative, electro-optical apparatus which measures the average relative phase of an incident wave fringe pattern. The subject fringe, e.g., an interferometric pattern, passes through three sections of an optical mask, one characterized by fixed transmissivity and the other two by quadrature-displaced spatial fringe patterns. The light passing through each section is separately collected and detected to average the respective incident wave/mask section interactions. The phase of the incident fringe pattern relative to the mask is then determined by arithmetically processing the detected signals.

In accordance with one aspect of the present invention, the subject fringe pattern is time modulated and the quadrature-shifted mask signals A-C coupled to obviate the requirement for the third, fixed transmissivity mask section. Pursuant to a further aspect of the instant invention, a fringe pattern may be made dependent upon the magnitude and phases of two complex numbers to permit complex multiplication.

DESCRIPTION OF THE DRAWING

The above and other features and advantages of the present invention will become more clear from consideration of a specific, illustrative embodiment thereof, presented hereinbelow in conjunction with the accompanying drawing, in which.

DESCRIPTION OF THE PREFERRED EMBODIMENT

Figure 1:
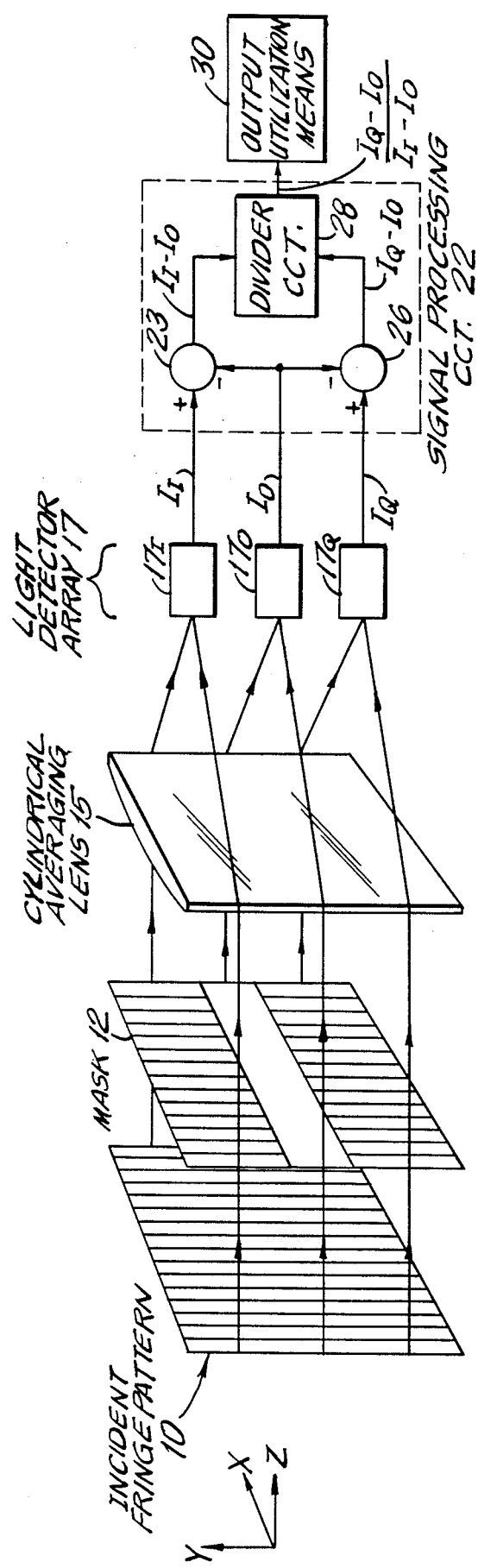
FIG. 1 is a block diagram of illustrative electro-optical apparatus for detecting the relative phase of an incident fringe pattern 10.
Figure 2:
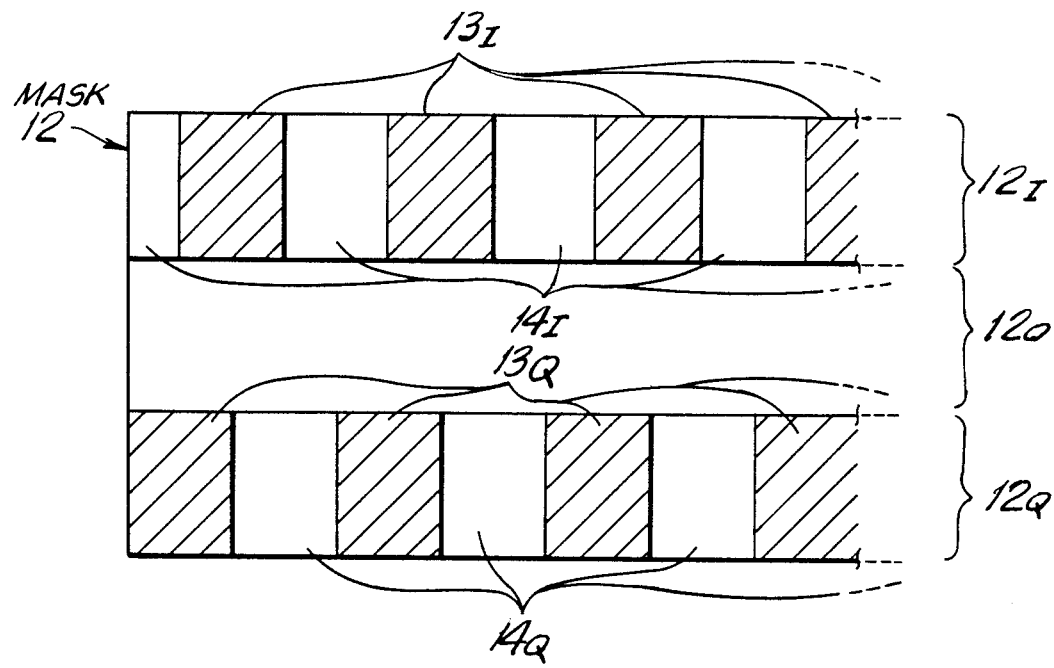
FIG. 2 is a side view characterizing the optical pattern employed on a mask 12 of FIG. 1.

Referring now to FIG. 1, there is schematically shown apparatus for determining the phase of an incident fringe pattern 10, e.g., in the z direction impinging upon the left face of a mask 12. The fringe pattern 10 is shown as being one dimensional, i.e., as varying in the x direction only, where the FIG. 1 apparatus is utilized to determine the relative phase of the pattern 10 in that x direction. The fringe pattern 10 may be generated in any manner well known to those skilled in the art. Thus, for example, the fringe may be an interferometric pattern generated by an interference developed when the portions of a split coherent beam undergo different physical paths. The optical pattern on mask 12 is illustrated in FIG. 2 and is discussed in greater detail below. Suffice it for present purposes that the mask 12 has three sections, the upper of which $12_I$ represents an in-phase (i.e., 0-reference phase) component, the middle section $12_O$ comprising a zone of constant light transmissivity, and the lower section $12_Q$ of which is deemed the quadrature-displaced section.

Light from the incident fringe pattern 10 passing through the respective sections $12_I$, $12_O$ and $12_Q$ of mask 12 is focused by a cylindrical averaging lens 10 onto one of three light detectors $17_I$, $17_O$ or $17_Q$ respectively. The detector outputs are supplied to a signal processing circuit 22 described hereinbelow which provides an output signal to output utilization means 30. The output signal of circuit 22 characterizes the relative phase or phase displacement of the fringe pattern 10 relative to the quadrature-displaced sections $12_I$ and $12_Q$ of the mask 12.

Turning now to FIG. 2, there is shown the optical pattern for each of the zones $12_I$, $12_O$ and $12_Q$ of mask 12. The pattern may be formed in any manner well known to those skilled in the art, e.g., by photodeposition. The in-phase upper section $12_I$ of mask 12 comprises a series of optically opaque areas $13_I$ having intermediate clear, light transmitting areas $14_I$ therebetween. The alternating areas 13 and 14 are shown of equal width (50% duty cycle) for purposes of illustration only. The relative sizes of adjacent areas 13 and 14 may be varied as desired subject only to the constraint that their combined width be equal to one wavelength of the fringe pattern, i.e., the distance between adjacent lines in the incident fringe field 10.

The lower, quadrature mask section $12_Q$ is of substantially the same form of the upper mask section $12_I$, i.e., contains alternating opaque and transparent sections $13_Q$ and $14_Q$ with the combined widths of contiguous opaque and transparent sections being equal to one wavelength at the incident fringe pattern wave frequency. The optical pattern in the quadrature shifted section $12_Q$ is displaced by 90 electrical degrees with respect to the upper section $12_I$. That is, for example, as illustratively shown in FIG. 2, the lower, quadrature section leads the pattern in the in-phase section $12_I$ by one quarter wavelength such that the leading edge of each opaque section $13_I$ begins in the middle of the corresponding opaque section $13_Q$ in the lower section $12_Q$ (for the assumed 50% duty cycle configuration). The purpose of the quadrature displacement is discussed hereinbelow. In FIG. 2, the right edge of the mask 12 is shown truncated. The mask 12 is made sufficiently wide to include a large number of fringe pattern wavelengths such that optical averaging occurs over a large number of wavelengths.

Finally, the central section $12_O$ of mask 12 includes an area of fixed transmissivity. For purposes below discussed, the transmission properties of the central section $12_0$ is made to be one-half of the value between the clear and dark sections 14 and 13 of the mask sections $12_I$ and $12_Q$. Alternatively, the mask section $12_O$ may be made clear, and a suitable electrical one-half correction made via an attenuator following the light detector $17_O$ below discussed.

With the above configuration in mind, attention will now be returned to FIG. 1. The apparatus there shown determines the relative phase or phase displacement of the incident fringe pattern 10. Let the transmittance of the mask 12 sections $12_I$, $12_O$ and $12_Q$ be represented by $T_I$, $T_O$ and $T_Q$, where $$T_I = \tfrac{1}{2}(1 + \cos kx) \quad (1)$$

$$T_O = \tfrac{1}{2} \quad (2)$$

$$T_Q = \tfrac{1}{2}(1 - \sin kx) \quad (3)$$

The incident spatial fringe pattern 10 is described by $$I(x) = A + B(x)\cos(kx + \phi) \quad (4)$$

where A is the D-C bias intensity, $B(x)$ is the fringe spatial modulation, if any, in the x direction; and $\phi$ is the fringe phase shift relative to the mask 12 which is to be determined.

The amount of light passing through the upper or in-phase section $12_I$ of mask 12 is the product of the light intensity $I(x)$ incident and the transmissivity function $T_I$ of the mask portion $12_I$:

$$I_I = I(x) \cdot T_I = \tfrac{1}{2}(A + B(x)\cos(kx+\phi)) + \tfrac{1}{2}(A\cos(kx) + B(x)\cos(kx+\phi)\cdot\cos kx) \quad (5)$$

As earlier observed, the cylindrical lens 15 performs an integration or averaging function over the width of the mask 12 since all rays, wherever occurring, algebraically add when focused upon the light detector 17. Accordingly, all terms in the equation 5 representation of the light $I_I$ reaching detector $17_I$ which include a term $\cos kx$ (or any other sinusoidal function of x) go to zero, the integral of the cosine over many wavelengths being substantially zero. Accordingly, Equation 5 reduces to $$I_I = \tfrac{1}{2}A + \tfrac{1}{2}B(x)\cdot\cos(kx+\phi)\cdot\cos kx \quad (6)$$

Using the identity $$\cos A \cdot \cos B = \tfrac{1}{2}\cos(A+B) + \tfrac{1}{2}\cos(A-B), \quad (7)$$

The light $I_I$ reaching detector $17_I$ is given by $$I_I = \tfrac{1}{2}A + \tfrac{1}{4}B(x)\cos(2kx+\phi) + \tfrac{1}{4}B(x)\cos\phi \quad (8)$$

The middle term in Equation 8 being a function of $\cos(2kx+\phi)$, this term goes to zero for the reason above discussed. Accordingly, the light incident detector $17_I$ is given by $$I_I = \tfrac{1}{2}A + \tfrac{1}{4}\overline{B}\cos\phi, \quad (9)$$

where $\overline{B}$ is the average of $B(x)$ over the width of the mask. In many cases, $B(x)$ will simply be a constant in any event even before averaging.

The light $I_0$ passing through the middle portion $12_0$ of mask 12 and reaching the light detector $17_0$ via the collecting lens 15 is given by the product of the incident light $I(x)$ and the transmissivity $T_0$ of the middle portion, such that $$I_0 = \tfrac{1}{2}A + \tfrac{1}{2}B(x)\cos(kx+\phi) \quad (10)$$

Since the second term in Equation 10 includes as a factor a cosine with an x-dependent argument, this term approaches zero and thus $$I_0 = \tfrac{1}{2}A. \quad (11)$$

The light $I_Q$ reaching the light detector $17_Q$ via the mask lower portion $12_Q$ is the product of the incident light $I(x)$ and the mask 12 quadrature section transmissivity $T_Q$. By an analysis identically paralleling that given above for the upper mask portion $12_I$ in Equations 5–9, $$I_Q = I(x) \cdot T_Q = \tfrac{1}{2}A + \tfrac{1}{4}\overline{B}\sin\phi. \quad (12)$$

As above noted, it is the ultimate objective of the FIG. 1 system to determine a value for the displacement angle $\phi$, i.e., the amount in which the incident fringe pattern 10 phase differs from the in-phase or reference phase mask component $12_I$. To this end, it is observed that $$\phi = \tan^{-1}(I_Q - I_O)/(I_I - I_O) \quad (13)$$

since, by inserting the relationships for $I_Q$ (Eq. 12), $I_0$ (Eq. 11) and $I_I$ (Eq. 9) into Equation 13, $$\phi = \tan^{-1}(\overline{B}/4 \cos\phi)/\overline{B}/4 \sin\phi) = \tan^{-1}(\sin\phi/\cos\phi) \quad (14)$$

For small angles where $$\phi \doteq \tan\phi, \quad (15)$$

the approximation for $\phi$ is $$\phi \doteq (I_Q - I_0)/(I_I - I_0). \quad (16)$$

As above noted the light detector array 17 includes elements $17_I$, $17_O$ and $17_Q$ for respectively providing an electrical output signal proportional to the light $I_I$, $I_0$ and $I_Q$ incident thereon representing the component of the incident fringe pattern 10 which passes through the corresponding mask section $12_I$, $12_0$ and $12_Q$ via the averaging lens 15. Each detector 17 may comprise any device well known to those skilled in the art for converting a light amplitude into an electronic voltage amplitude, e.g., photomultipliers, photodiodes, or the like. Thus, the electrical output signals from the detector array $17_I$, $17_0$ and $17_Q$ provide a measure of the quantities $I_I$, $I_0$ and $I_Q$ of Equations 9, 11 and 12, respectively.

In the signal processing circuit 22, an algebraic summing (here subtracting) element 26 (e.g., an operational amplifier with non-inverting and inverting inputs) generates the quantity $I_Q - I_0$ in the arc tangent numerator of Equation 13 by subtracting $\frac{1}{2}A$ (Equation 11) from the $I_Q$ relationship of Equation 12. Similarly, an algebraic summing (arithmetically subtracting) element 23 develops the arc tangent denominator $I_I - I_0$ of Equation 13 by subtracting $\frac{1}{2}A$ (Equation 11) from $I_I$ (Equation 9). The quotient $(I_Q - I_0)/(I_I - I_0)$ is then computed in a divider circuit 28 and may directly constitute a measure of the phase $\phi$ to be measured if small angle displacement is assumed (Equation 16). If larger angle displacements are permissible or contemplated in the application of the FIG. 1 system, output utilization means 30 (or signal processing circuit 22) includes apparatus for computing the arc tangent function of the argument supplied thereto by the divider 28 (Equation 13) to develop a more precise value for the phase angle $\phi$. In either event, output utilization means is furnished with the phase angle $\phi$ for differing uses depending upon the specific application intended. Thus, for example, where distance is measured by interferometric interference, the phase angle $\phi$ represents distance and can be used in a servomechanism controller to reposition a controlled element as desired. This type of application is useful as in robotics to control the relative position of a robotic work element (e.g., welder, grasping arm or the like) vis-a-vis a work piece to be operated upon.

The signal processing circuit 22 is shown as implemented by discrete algebraical adder and divider elements 23, 26 and 28 which may be analog in nature. The signal processing circuitry 22 (and the arc tangent calculation of output utilization means 30 if desired) may of course all be implemented by a single microprocessor where the electrical representations of the light quantities $I_I$, $I_0$ and $I_Q$ become microprocessor input variables entered as via a multiplexer and analog-to-digital converter.

The above arrangement has thus been shown to compute the relative phase of a one dimensional fringe pattern 10 relative to the reference phase defined by the upper section $12_I$ of a mask 12.

Figure 3:
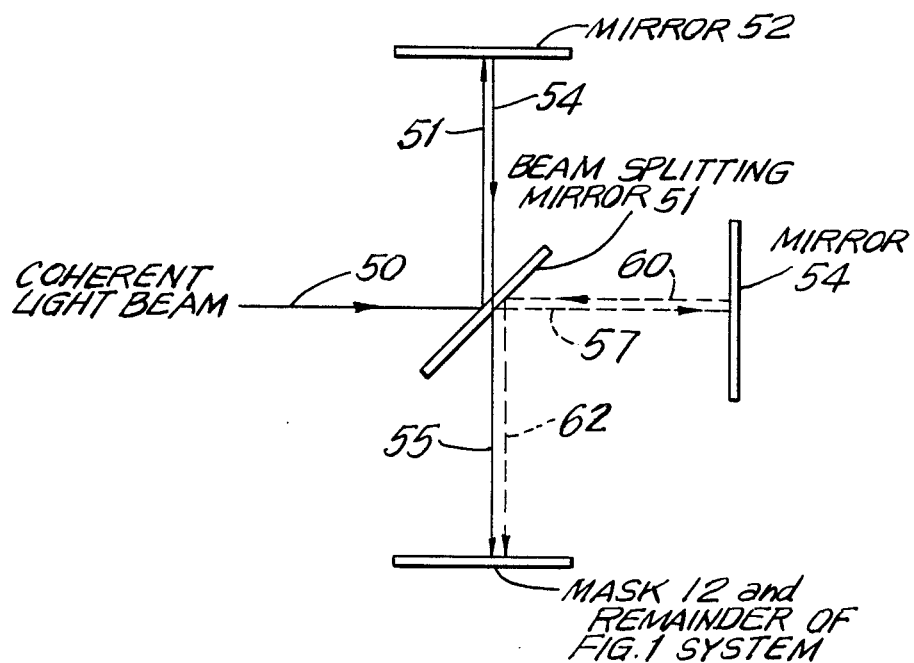
FIG. 3 illustrates one particular application of the FIG. 1 apparatus as in an interferometer application.

Turning now to FIG. 3, there is shown an interferometer application of the instant invention. A coherent light beam 50 is incident upon a beam splitting mirror 51. A portion of the incident beam reflected by mirror 51 follows a solid line path in FIG. 3 beginning with path portion 52 to the lower fully reflecting surface of a mirror 52. This reflected beam follows the path 54 passing through the mirror 51 and is incident upon the mask 12 via the path 55. A second portion of the light beam 50 incident the beam splitting mirror 51 follows the dotted path, passing through the mirror 51 and following the dotted path 57 to a second fully reflecting mirror 54, a mirror 54 reflected path leg 60, and a mirror 51 reflected path portion 62 to the mask 12.

The two coherent beam signals reaching the mask 12 via path legs 55 and 62 interfere and cause a fringe pattern 10 on the face of the mask 12 of the composite FIG. 1 apparatus. If any small displacement occurs for the mirror 54 relative to the mirror 52, the interference pattern will change its phase and this phase change will be detected by the FIG. 1 apparatus. Thus, the output of divider circuit 28 coacting with the utilization means 30 may be employed as an error detector in a servomechanism loop to maintain the relative distance between mirror surfaces 52 and 54 in any relationship desired to an accuracy a small fraction of the wavelength of the coherent light of beam 50. Obviously, one reflecting surface 52 or 54 may be fixed, and the other disposed on any mechanical element whose position is to be monitored or controlled.

The interferometer application above discussed and shown in FIG. 3 is for purposes of illustration only. For example, the fringe pattern 10 may vary in two directions (x and y shown in FIG. 1). A beam splitting mirror (comparable to the mirror 51 in FIG. 3) may be disposed to the left of the mask 12 in FIG. 1. The FIG. 1 apparatus will then operate in the manner fully set forth above to detect the phase displacement $\phi$ in the x direction. The FIG. 1 apparatus is also replicated in a vertical orientation (but rotated 90°) to detect the phase variation in the y direction of the incident two dimensional fringe pattern furnished by the beam splitting mirror.

Moreover, the instant invention is not limited to Cartesian fringe fields. Coherent light applications (e.g., lasers with end mirrors) generate an etalon fringe formed of concentric circles. The in-phase and quadrature mask components for such a fringe field formed of concentric circles would themselves thus be concentric circles spatially radially displaced by 90°. Similarly, any incident fringe field of whatever shape may be phase detected by having in-phase and quadrature masks or mask sections, again offset by 90 degrees (one-quarter of the inter-line spacing).

It is observed that the central mask section $12_0$ was required to generate the quantity $\frac{1}{2}A$ (Equation 11) for purposes of the algebraic subtractions of Equation 13 and/or 15. In physical terms, this subtracts out a fixed, time-invariant bias term. If the quantities $B/4 \cos \phi$ (Equation 9) and $B/4 \sin \phi$ (Equation 12) can be made time dependent, the undesired $A \frac{1}{2}$ bias term can be eliminated by high pass filtering. This may be effected, for example, by electronically controlling (modulating) the light passage portions 14 of mask sections $12_I$ and $12_Q$ (e.g., by making the clear portions 14 of electronically sensitive liquid crystals such that the portions are either opaque or transparent depending upon the applied potential). Once a time dependency is imparted, as above noted, the outputs of the light detectors $17_I$ and $17_Q$ are simply A-C (capacitively) coupled to the divider circuit 28 input terminals.

Figure 4:
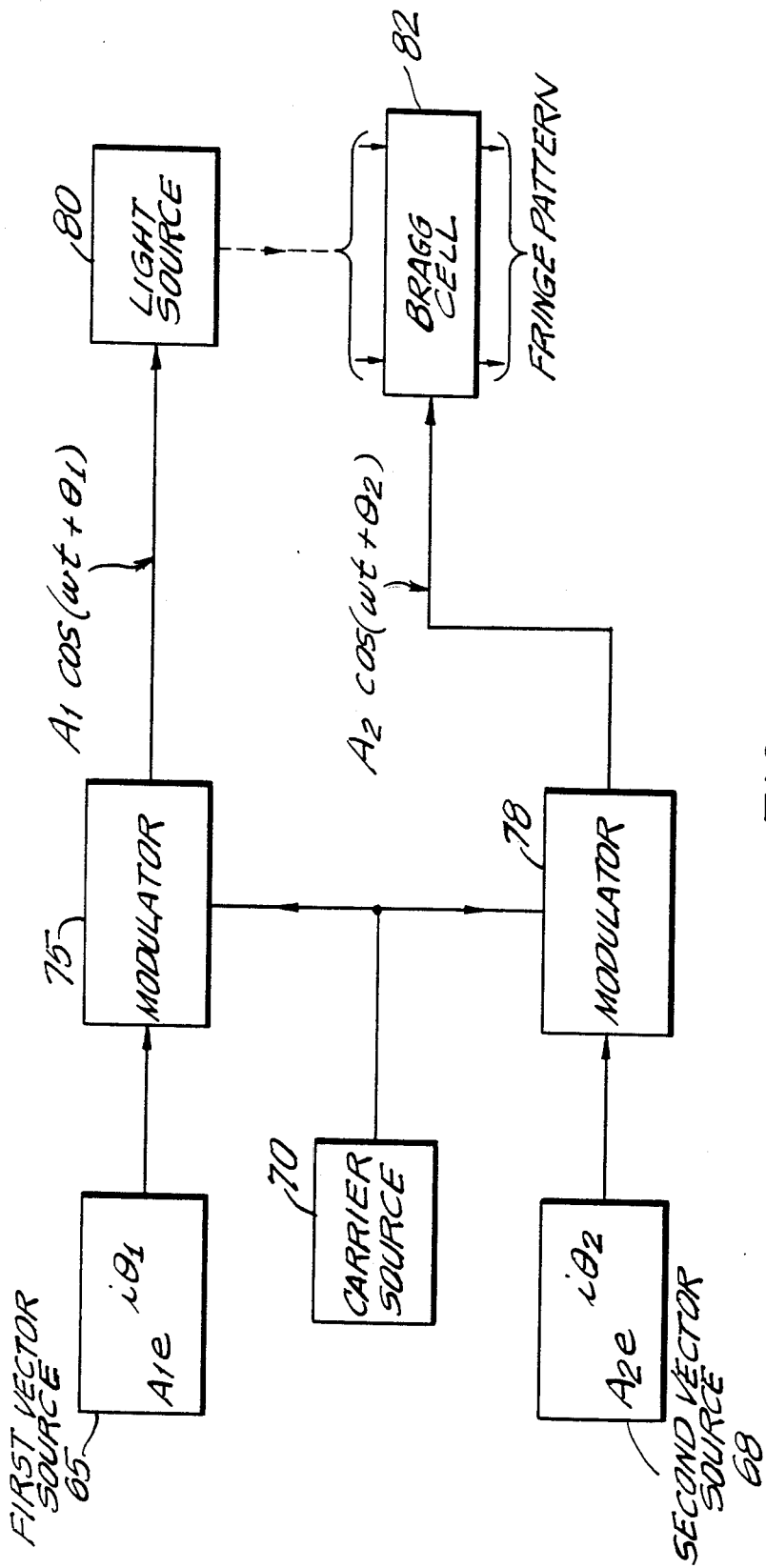
FIG. 4 schematically illustrates apparatus for generating a fringe pattern which depends upon, and which permits multiplication of, two complex numbers.

Turning now to FIG. 4, there is shown apparatus for generating a fringe pattern (output of Bragg cell 82) which permits complex multiplication after processing by the FIG. 1 apparatus. Applications of present importance require that two complex quantities be multiplied as in radar signal processing and radar signal jamming and noise avoidance, ultrasound signal processing to avoid spurious noise signals and so forth. In such applications a first complex number may be given by $A_1 e^{i\phi 1}$ and a second complex number given by $A_2 e^{i\phi 2}$. Such complex numbers are supplied in FIG. 4 via the sources thereof 65 and 68. A carrier source 70 is applied to two amplitude modulators 75 and 78 the outputs of which are thus $A_1 \cos(\omega t + \phi_1)$ and $A_2 \cos(\omega t + \phi_2)$. The first complex number at the $\omega$ carrier frequency is employed to modulate the amplitude of light supplied by a light source 80 which is used to strobe the Bragg cell 82. A lens may be employed intermediate light source 80 and Bragg cell 82 such that the entire width of the Bragg cell may be illuminated with a plane wave. The second signal representing a complex quantity at carrier frequency supplied by modulator 78 modulates the ultrasonic transducer in the Bragg cell.

As is per se well known, the ultrasonic transducer in a Bragg cell gives rise to alternating area of local compaction and rarification in the Bragg cell glass as the ultrasonic wave propagates therethrough, thus creating areas of increased and decreased index of refraction in the glass. Thus, when the light supplied by the source 80 passes through the Bragg cell, since it is of the same frequency as the excitation applied to the transducer (coherent signals), the output of the Bragg cell is in all material respects a fringe pattern. Since light source 80 acts as a strobe for the traveling acoustic wave through the Bragg cell glass, the areas of perceived light peaks and troughs shift spatially as the phase varies between complex numbers. Similarly, the amount of light exciting the Bragg cell is proportional to the product of the light supplied by source 80 (applied excitation) and the applied acoustic modulation (degree of index of refraction modulator).

In complex multiplication, it is desired to determine the quantity $A_1 \cdot A_2$ which is the amplitude of the multiplied complex numbers ad to obtain a measure of the sum of the complex phase angles, i.e., $(\phi_1 + \phi_2)$. That is, the amplitude product and the phase angle sum provide the results of the complex multiplication. When the fringe pattern of FIG. 4 is applied to the FIG. 1 electro-optical system, the summed phase angle information is identically present at the output of the FIG. 1 divider circuit 28 (small angle assumption) or the arc tangent computation in output utilization means 30. Similarly, the amplitude product $A_1 A_2$ is available at the output of the light detector 17₀ with a scaling factor of "2" which can be supplied by an operational amplifier or otherwise in a manner well known to those skilled in the art. Accordingly, the fringe pattern developed in accordance with FIG. 4, impinging upon the FIG. 1 system, provides a fast, inexpensive way of rapidly effecting complex multiplication.

The above-described apparatus is merely illustrative of the principles of the present invention. Numerous modifications and adaptations thereof will be readily apparent to those skilled in the art without departing from the spirit and scope of the present invention.

What is claimed is:

1. In combination in apparatus for detecting the phase of an incident light fringe pattern, first and second mask means each having an alternating array of light passing and light blocking area corresponding to the incident light fringe patterns, the light passing and blocking array of said second mask means being quadrature offset with respect to the array of said first mask means, first and second light detectors, and averaging light collecting means disposed intermediate said first and second mask means and said first and second light detectors for coupling the fringe pattern light passing through said first and second mask means onto said first and second light detectors, respectively; and divider means connected to said first and second light detectors for determining the quotient of the output signals of said light detectors.

2. A combination as in claim 1, further comprising means for time-varying the light output supplied by said first and second mask means, and alternating-current coupling means connecting said light detectors and said divider means.

3. In combination in apparatus for detecting the phase of an incident light fringe pattern, first and second mask means each having an alternating array of light passing and light blocking areas corresponding to the incident light fringe patterns, the light passing and blocking array of said second mask means being quadrature offset with respect to the array of said first mask means, first and second light detectors, and averaging light collecting means disposed intermediate said first and second mask means and said first and second light detectors for coupling the fringe pattern light passing through said first and second mask means onto said first and second light detectors, respectively, and third mask means characterized by constant light transmissivity, a third light detector, said light collecting means further including means for transmitting light passing through said third mask means to said third light detector, and subtracting means connected to said first, second and third light detectors.

4. A combination as in claim 3, further comprising divider means connected to said subtracting means.

5. A combination as in claim 2 or 4, further comprising arc tangent computing means connected to said divider means.

6. A combination, as in claim 5, further comprising means for supplying a light fringe pattern to each of said mask means.

7. A combination as in claim 6, wherein said light fringe pattern supplying means includes acoustically modulated light transmitting means, first complex signal dependent signal source means for modulating said acoustically modulated light transmitting means, a light source irradiating said acoustically modulated light transmitting means, and second complex signal dependent means for modulating the light supplied by said light source means.

8. A combination as in claim 1, 3 or 4, further comprising means for supplying a light fringe pattern to each of said mask means.

9. A combination as in claim 8, wherein said light fringe pattern supplying means includes acoustically modulated light transmitting means, first complex signal dependent signal source means for modulating said acoustically modulated light transmitting means, a light source irradiating said acoustically modulated light transmitting means, and second complex signal dependent means for modulating the light supplied by said light source means.

10. In combination in apparatus for multiplying two complex quantities, light fringe pattern supplying means, first and second mask means each having an alternating array of light passing and light blocking areas corresponding to the incident light fringe patterns, the light passing and blocking array of said second mask means being quadrature offset with respect to the array of said first mask means, first and second light detectors, and averaging light collecting means disposed intermediate said first and second mask means and said first and second light detectors for coupling the fringe pattern light passing through said first and second mask means onto said first and second light detectors, respectively, said light fringe pattern supplying means including acoustically modulated light transmitting means, first complex signal dependent signal source means for modulating said acoustically modulated light transmitting means, a light source irradiating said acoustically modulated light transmitting means, and second complex signal dependent means for modulating the light supplied by said light source means.

11. A combination as in claim 10, further comprising divider means connected to said first and second light detectors for determining the quotient of the output signals of said light detectors.

12. A combination as in claim 10, further comprising third mask means characterized by constant light transmissivity, a third light detector, said light collecting means further including means for transmitting light passing through said third mask means to said third light detector, and subtracting means connected to said first, second and third light detectors.

13. A combination as in claim 10, wherein said acoustically modulated light transmitting means comprises a Bragg cell.

* * * * *